United States Patent

[11] 3,614,135

| | | |
|---|---|---|
| [72] | Inventor | John S. Eid<br>Winneconne, Wis. |
| [21] | Appl. No. | 31,050 |
| [22] | Filed | Apr. 15, 1970 |
| [45] | Patented | Oct. 19, 1971 |
| [73] | Assignee | J. I. Case Company<br>Racine, Wis. |

[54] WEIGHT BOX ATTACHMENTS FOR TRACTORS
2 Claims, 5 Drawing Figs.

[52] U.S. Cl. ................................... 280/491 E,
220/3.94, 220/4, 280/150 E
[51] Int. Cl. ................................................. B60d 1/00
[50] Field of Search............................................ 280/150,
150 D, 150 E, 150 F, 491 E, 505, 515; 220/3.94, 4,
4 A; 224/32, 32 A, 29, 42.03 A; 212/48, 49;
172/790

[56] References Cited
UNITED STATES PATENTS

| 2,440,550 | 4/1948 | Martin............... | 280/150 E X |
| 2,560,570 | 7/1951 | Harig............... | 224/42.44 |
| 2,850,293 | 9/1958 | Hall............... | 280/491 E |
| 3,517,941 | 6/1970 | Lazzeroni............... | 280/150 E |

*Primary Examiner*—Benjamin Hersh
*Assistant Examiner*—Winston H. Douglas
*Attorney*—Cullen, Settle, Sloman & Cantor

ABSTRACT: An attachment for tractors which provides a weight box at the ends of the tractor frame rails and which may be optionally used as desired and which has a dawbar or hitchplate at its end.

PATENTED OCT 19 1971

3,614,135

JOHN S. EID.

BY

CULLEN, SETTLE, SLOMAN & CANTOR.

ATT'YS.

WEIGHT BOX ATTACHMENTS FOR TRACTORS

BACKGROUND OF THE INVENTION

When tractors are used under certain load conditions as, for example, as a bulldozer or as a snow blower there arises often a tendency for the tractor to tilt forward and in the use of such tractors under such conditions, there is a serious problem of keeping the rear end of the tractor firmly on the ground.

Tractors are commonly equipped with drawbar or hitching elements at the ends of the frame rails.

An obvious answer to the problem just described is to provide weights on the ends of the frame rails to keep the rear end of the tractor on the ground. Often such weighting has been attempted by suspending heavy weights on the rails but this is make-shift expedient and is by no means desirable. Similarly, it has been contemplated to put weights into a box and in some way or other locate the box on the rear end of the tractor. This make-shift expedient has also proven undesirable.

SUMMARY OF THE INVENTION

By my invention I provide an attachment which may be optionally used as desired, and which may be sold as an attachment, and may quickly and conveniently be mounted on the frame rails of a tractor to provide a weight box or receptacle for weights whenever it is desired to weight the rear end of a tractor.

The box is so designed that it is interchangeable. It may be sold as a separate attachment. Tractors may be sold without such attachments. The attachment can be bought separately at any time and can be added to a tractor at any time as desired or removed from a tractor when desired.

When so mounted the box provides a suitable receptacle in a desirable location for weights to help maintain the rear end of the tractor on the ground despite heavy front loads.

A specific feature of the attachment here described is that it may be added to an existing tractor, already equipped with a drawbar or hitch panel at the ends of the frame rails, without loss of the existing drawbar or hitch plate and without loss of the hitching feature.

BRIEF DESCRIPTION OF THE DRAWINGS

A specific embodiment of the invention is disclosed in the appended drawing. In such drawings.

DESCRIPTION OF PREFERRED EMBODIMENT

Figure 1:
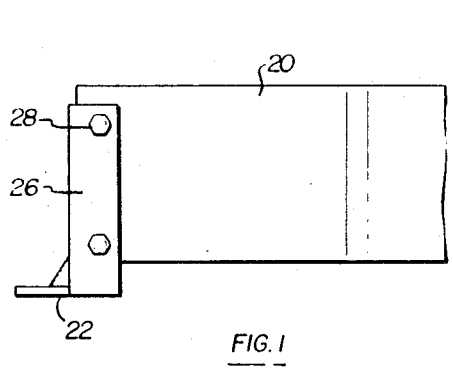
FIG. 1 is a side elevation view of a portion of the frame rails at the end of a tractor equipped with a presently known drawbar or hitch plate removably mounted on the frame rails.
Figure 2:
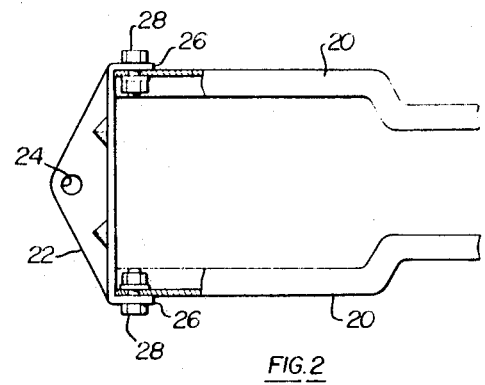
FIG. 2 is a top plan view of FIG. 1.

Persons skilled in the art of tractors are well acquainted with the fact that in a typical tractor construction there are frame rails. These are parallel, horizontally spaced frame rails of considerable vertical dimension and these have free rear ends.

The drawings show diagrammatically only the free or rear ends 20 of such rails in parallel, horizontally spaced, vertically positioned relation.

It is presently known to provide at such free ends 20 a drawbar or hitch plate 22 having a connecting hole 24 and having flanges 26 connected by bolts 28 to the ends 20.

Figure 3:
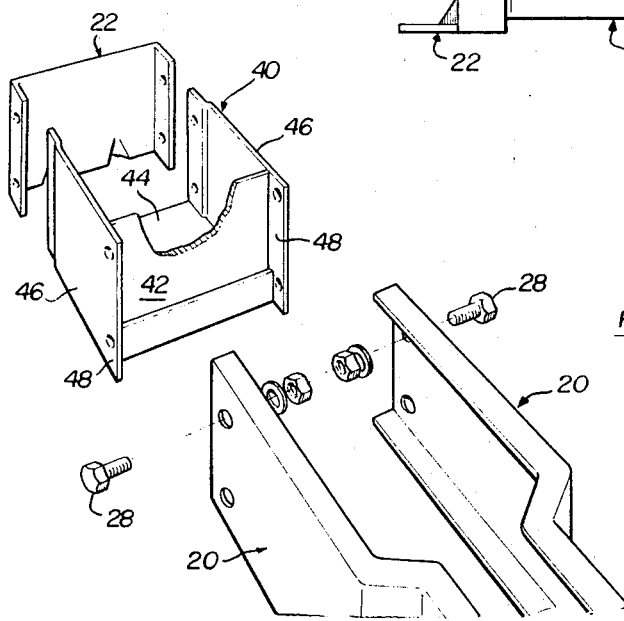
FIG. 3 is a perspective view of an attachment of my invention.

My invention includes a weight box attachment shown in perspective in FIG. 3 and properly dimensioned to fit the rails 20 for the purposes later to be described. The weight box attachment of FIG. 3 is a unitary, preassembled, three-sided, closed-bottom, open-top, heavy-gauge sheet metal box 40 adapted to be applied as an attachment unit to the free ends of the rails 20, these rails being normally connected by the hitch plate 22.

The box 40 comprises a front plate 42, a bottom plate 44, and two side plates 46. The latter extend well forward of the front plate to provide short parallel wings 48 enabling the box to be secured to the ends 20 of the rails by the same bolts 28 as were previously used and as are normally used to secure the hitch plate 22 to the rails 20.

The side plates 46 are about equal in height to the rails 20 and the bottom and front plates 44 and 42 are about equal in width to the space between the rails 20.

Figure 5:
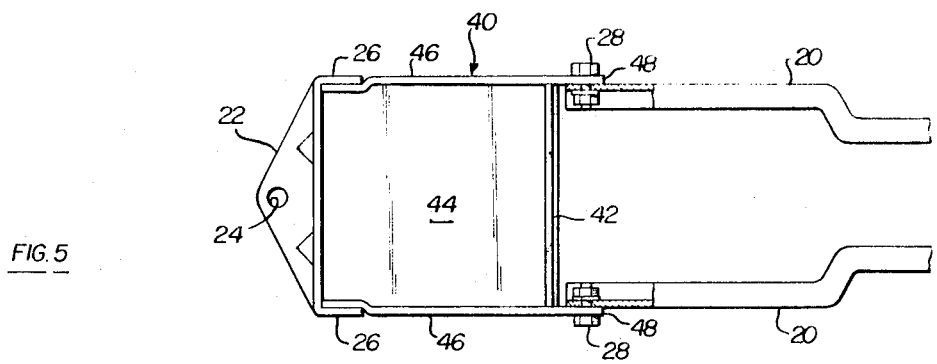
FIG. 5 is a top plan view of FIG. 4.
Figure 4:
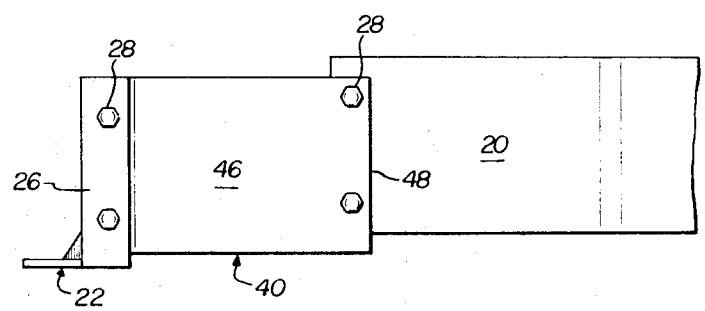
FIG. 4 is a view like FIG. 1 but showing the attachment of FIG. 3 in place between the frame rails and the drawbar or hitch plate.

If and when a box 40 is mounted upon rails 20 as is shown in FIGS. 4 and 5, the hitch plate 22 is adapted to be secured to the open or rear end of the box to close such end and connect the sides 46 of the box with the hitch plate 22 being parallel to the front plate 42.

When the parts are combined in the manner just described there is provided a tractor including the combination of the rails 20, the box 40, and the hitch plate 22 with such combination being effective for receiving weights which ensure the rear end of the tractor remaining on the ground despite adverse front load conditions.

The tractor may be sold, as is conventional, with a hitch plate 22 as standard equipment.

The box 40 may be sold as an attachment.

Whenever a user desires to incorporate within his tractor the attachment in the form of a box 40 he may purchase such an attachment and mount it in a simple manner upon the tractor, simply by removing the hitch plate 22, mounting the box 40 where the hitch plate 22 has been mounted, and then mounting the hitch plate 22 on the open end of the box 40 if desired.

The merchandizing of the tractor is not complicated by the requirement that a user purchase a weight box attachment. On the other hand, the merchandizing of a tractor is not complicated by the absence of a simple arrangement for weighting the end of the tractor if and when desired.

It is to be noted that the box 40 is not a complete four-sided box but has a built-in economy feature, namely that one side is open and is adapted to be closed by the already provided hitch plate.

On the other hand, if the user for reasons of his own prefers to leave the end of the box open, this he may also do simply by not remounting the hitch plate 22.

On the other hand, if he desires to maintain the hitching feature within the tractor, he does not lose such hitching feature by having mounted the box on the end of the rails of the frame. The box provides a simple and effective mounting location for the hitch plate as the frame rails themselves do, preserving all of the necessary and desirable features for mounting the hitch panel.

Now having described the embodiment of the invention herein disclosed, reference should be had to the claims which follow.

I claim:

1. For use with a tractor having parallel, horizontally spaced, vertically disposed frame rails having free ends;
   a unitary preassembled weight box for attachment to the free ends of the rails for connecting them and for forming a four-sided weight box at the ends of the rails and comprising a front plate, a bottom plate, and two side plates, with the latter extending well forward of the front plate as to provide short parallel wings enabling the box to be secured to the ends of the rails; with the side plates being about equal in height to the rails and with the bottom and front plates being about equal in width to the space between the rails; and with the rear end of the box normally being open; and a hitch panel adapted to be secured to the open or rear end of the box to close such end and having a rearwardly extending hitching flange, with aid switch panel connecting the sides of the box and being parallel to the front plate.

2. A unitary, preassembled, three-sided, closed-bottom, open-top weight box adapted to be applied as an attachment unit to the free ends of parallel, horizontally spaced, vertically disposed frame rails of a tractor, these having their free ends normally connected by a vertical hitch panel having a rearwardly extending hitching flange; said box comprising a front plate, a bottom plate, and two side plates, with the latter extending forward of the front plate so as to provide short parallel wings enabling the the box to be secured to the ends of the rails, with the side plates being about equal in height to the rails and with the bottom and front plates being about equal in width to the space between the rails, and the rear end of the box being open; said hitch panel being adapted to be secured to the open or rear end of the box to close such end and connect the sides of the box and be parallel to the front plate.